US011709749B1

(12) United States Patent
Hockey et al.

(10) Patent No.: US 11,709,749 B1
(45) Date of Patent: Jul. 25, 2023

(54) DIAGNOSTIC DATA COLLECTION FOR KUBERNETES

(71) Applicant: MICROSOFT TECHNOLOGY LICENSING, LLC, Redmond, WA (US)

(72) Inventors: Alex John Hockey, London (GB); James Turner, Enfield (GB); Huw Ivor George Thomas, Enfield (GB); Thomas Robert Steavenson, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/567,881

(22) Filed: Jan. 3, 2022

(51) Int. Cl.
*G06F 11/30* (2006.01)
*G06F 11/34* (2006.01)

(52) U.S. Cl.
CPC ...... *G06F 11/3034* (2013.01); *G06F 11/3006* (2013.01); *G06F 11/3072* (2013.01); *G06F 11/3409* (2013.01)

(58) Field of Classification Search
CPC .............. G06F 11/3006; G06F 11/301; G06F 11/3034; G06F 11/3065; G06F 11/3072; G06F 11/3476; G06F 11/3409; G06F 2009/45591
See application file for complete search history.

(56) References Cited

U.S. PATENT DOCUMENTS

| 2013/0227352 | A1* | 8/2013 | Kumarasamy | G06F 11/3072 714/47.1 |
| 2018/0102938 | A1* | 4/2018 | Yoon | G06F 16/358 |
| 2022/0114004 | A1* | 4/2022 | Hsu | G06F 9/547 |
| 2022/0138023 | A1* | 5/2022 | Shuster | G06F 11/0709 714/38.1 |

FOREIGN PATENT DOCUMENTS

| CN | 110232054 | A | * | 9/2019 | ........ G06F 16/172 |
| CN | 112527459 | A | * | 3/2021 | |
| CN | 113849475 | A | * | 12/2021 | |
| CN | 114064216 | A | * | 2/2022 | |

* cited by examiner

*Primary Examiner* — Yolanda L Wilson
(74) *Attorney, Agent, or Firm* — Han Gim; Newport IP, LLC (57) ABSTRACT

Techniques are disclosed for capturing diagnostics data in a distributed computing environment comprising a plurality of computing devices executing a plurality of Kubernetes pods. A worker node is configured with a staging area for storing temporary diagnostics data. An agent is configured to upload the temporary diagnostics data. Each container in the worker node is assigned a directory in the staging area for writing the container's temporary diagnostics data. When a container in the worker node has written a temporary diagnostics data file to the container's directory in the staging area, the temporary diagnostics data file is uploaded to the persistent storage.

20 Claims, 5 Drawing Sheets

DIAGNOSTIC DATA COLLECTION FOR KUBERNETES

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines or containers that appear and operate as independent computing resources. The data center can create, maintain or delete virtual machines or containers in a dynamic manner. Many platforms use Kubernetes as a container orchestration system for application deployment, scaling, and management.

In many cases, the data center may want to capture data for a variety of reasons, such as to investigate system and network events. Troubleshooting such events may be difficult to perform given the complexity of data centers. For example, containers that run on Kubernetes may generate diagnostic files that need to be collected (e.g., core file, stack traces, Java heap dumps, packet captures). It is with respect to these considerations and others that the disclosure made herein is presented.

SUMMARY

In a distributed computing environment such as a clustered Kubernetes environment, diagnostic data capture can be a processing and labor-intensive task. In such an environment, a user or service must ensure that every container of a pod or cluster of interest has the necessary diagnostic data capture services. For example, a user or service must log into each container and launch a diagnostic data capture function. The captured data may be stored in a temporary location in the container, which must then be copied over to a local machine. Additionally, due to the ephemeral nature of Kubernetes clusters where the number of pods can scale up or down, the described process must be repeated when new pods are created or the captured data must account for deleted pods.

The disclosed embodiments describe technologies for a consistent and centralized way to capture diagnostics data in a Kubernetes environment across multiple types of containers and from multiple Kubernetes pods. This may allow data centers to more effectively adhere to operational objectives and at the same time improve operating efficiencies.

In an embodiment, a persistent file store may be used to store and persist diagnostic files. Each container may be assigned a unique directory in the persistent file store. In one embodiment, the unique directory may be assigned based on the container's name, pod, namespace, and cluster ID (where cluster ID may also be hierarchical—e.g., cluster name, zone, region).

Each Kubernetes worker node may be configured with a directory to act as a staging area. Diagnostics may be stored in the staging area before being pushed to the persistent storage. Each container may be assigned its own directory in the staging area based on the container's name, pod, and namespace.

In an embodiment, the container's directory in the staging area may be mounted into the container as a well-known directory name. In one embodiment, the directory may be mounted automatically to each container using a mutating admission webhook.

When an application generates a diagnostic file, the application may write the file to the well-known directory. An agent running on the node may determine that the application has completed writing the file and upload the file to the persistent store. The agent may be configured to ensure that files are not accidentally overwritten in the staging area by the container before being uploaded. In some embodiments, the core files may be written the well-known directory by the OS kernel and not by the container.

The disclosed embodiments allow for any diagnostic to be collected from a container and further allows for different types of diagnostics, including core files, to be handled in a uniform way. By providing such a mechanism for capturing diagnostic data, data centers may operate more efficiently, and reduction or loss of services provided by service providers may be avoid or mitigated, reducing downtime and impact to end users and providing for greater operational efficiency for service providers. Additionally, the entity deploying an application will not need to add any configuration or code to allow for the diagnostic data to be collected.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following Detailed Description describes technologies for diagnostic data collection in a Kubernetes environment. In such networks, it may be difficult, for example, to capture diagnostic data to troubleshoot and identify causes of events such as an application crash.

In a clustered Kubernetes environment, diagnostic data collection can be a processing and labor-intensive task. Containers that run on Kubernetes may generate diagnostic files that need to be collected (e.g., core file, stack traces, Java heap dumps, packet captures). However, collection of diagnostic files presents some challenges. First, containers are ephemeral. Containers can be instantiated and torn down at any time, but the diagnostics data needs to be persisted. Second, a deployment may contain multiple Kubernetes clusters from which diagnostics data should be collected. Third, it may be desirable to collect diagnostics from the containers without having to modify them (e.g., to make use of a SDK). Containers may be written in different languages (thus making it difficult to develop such an SDK), or containers may be third party containers, or containers may not be actively maintained. The different languages have different characteristics and can generate diagnostics in different ways.

Described herein are methods and systems for a unified and centralized way to capture and persist diagnostics data in a distributed computing environment. Embodiments may allow for the capture of diagnostics data, for example, in a Kubernetes environment from multiple Kubernetes pods. This allows the service provider to access and utilize diagnostics without the need for multiple tools to access the diagnostics.

In an embodiment, a persistent file store may be used to store diagnostic files. Each container may be assigned a unique directory in the persistent file store. The unique directory may be assigned, for example, based on the container's, name, pod, namespace, and cluster ID (where cluster ID may also be hierarchical—e.g., cluster name, zone, region).

Each Kubernetes worker node may be configured with a directory to act as a staging area. Diagnostics data may be stored in the staging area before being pushed to the persistent storage. Each container may be assigned its own directory in the staging area based on the container's name, pod, and namespace.

The container's directory in the staging area may be mounted into the container as a well-known directory name. In one embodiment, this may be done automatically to each container using a mutating admission webhook.

When an application generates a diagnostic file, the application may write the diagnostic file to the well-known directory. In an embodiment, an agent may be implemented in the node and the agent may be configured to monitor the staging area and upload diagnostic files when writing is complete. The agent may wait for the file to be completed and then upload the completed file to the persistent store. The agent may ensure that files are not accidentally overwritten in the staging area by the container before being uploaded. In one embodiment, the agent may move a file to a separate directory (not visible to the container) as soon as it has been opened.

In some embodiments, core files may be written by the OS kernel (e.g., Linux kernel) and not by the container. The OS kernel may write the file to the well-known directory as seen by the container. This may be useful, for example, where the application has crashed and only the core files from the OS are available.

The disclosed embodiments provide a way for diagnostic files to be obtained and persistently stored in a uniform way across a deployment. While other methods may be implemented for saving core files and either writing the files directly to persistent storage or to a staging area for later upload, these approaches may only work for core files and not for diagnostics directly from the container (such as stack traces, Java heap dumps, or packet captures).

While there may be approaches to mount a persistent storage medium directly into a container, these approaches require an administrator to edit the Kubernetes objects to set up this approach. Additionally, this approach may not prevent diagnostic files from being accidentally overwritten.

The disclosed embodiments enable a container to be automatically provided with a location to place its diagnostics without manual intervention. By implementing an agent to monitor and upload diagnostics data, losing diagnostics data due to overwriting may be avoided. Additionally, the disclosed embodiments enable the collection and persistent capture of all diagnostics and not just core files. The core files may be written to the same staging area as other diagnostics data and are not treated as a special case. The disclosed embodiments support pods that include multiple containers, and multiple Kubernetes clusters sharing a common persistent storage.

The disclosed embodiments enable the capture of diagnostics needed to troubleshoot and diagnose issues in deployments running on Kubernetes, enabling greater operational efficiencies. Additionally, the disclosed embodiments enable the capture and presentation of diagnostics from disparate products and suppliers in a single uniform structure, which allows for greater supportability. Finally, an entity deploying an application into the computing environment will not need to add any configuration or code to allow for the collection of diagnostics data. For example, the provider of the computing environment may provide a setting for customers to activate this feature and the service can be provided automatically without further customer input. The diagnostics data may be used, for example, to troubleshoot issues, analyze performance issues, and the like.

While the disclosed embodiments are described in a Kubernetes environment that deploys workloads in containers, it should be understood that the described principles may be applied in other environments where virtualized resources (e.g., virtual machines) are deployed and where it is desired to obtain and persist diagnostics data from those virtualized resources.

Figure 1:
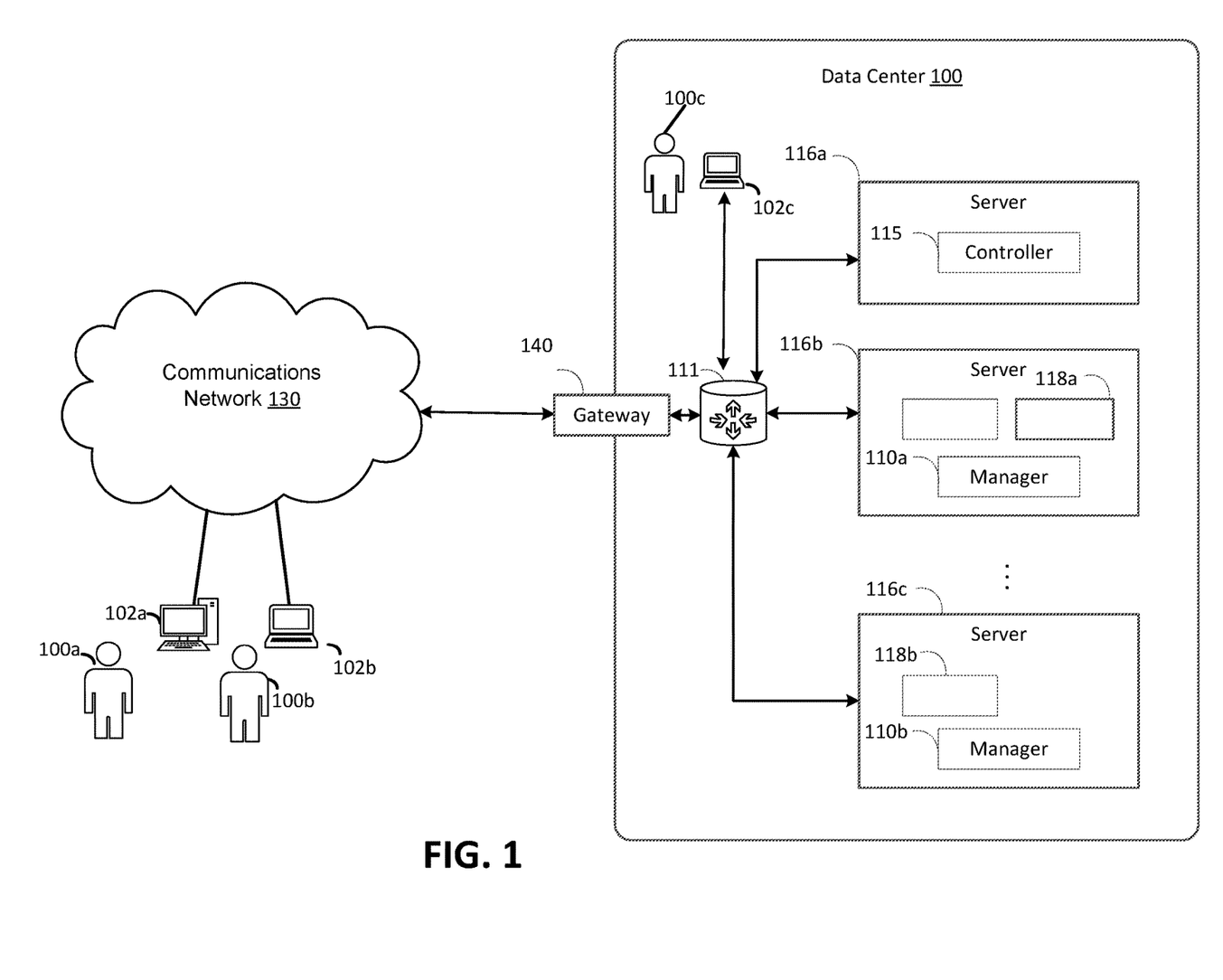
FIG. 1 is a diagram illustrating a data center in accordance with the present disclosure.

FIG. 1 illustrates one example of a general computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines or containers 118a and 118b (which may be referred to herein singularly as "a virtual machine 118" or in the plural as "the virtual machines 118" or as "a container 118" or in the plural as "the containers 118"). The virtual machines or containers 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines or containers on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines or containers 118 on servers 116, for example.

It should be appreciated that although the embodiments disclosed above are discussed in the context of virtual machines and containers, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The disclosed embodiments may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF). MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 2:
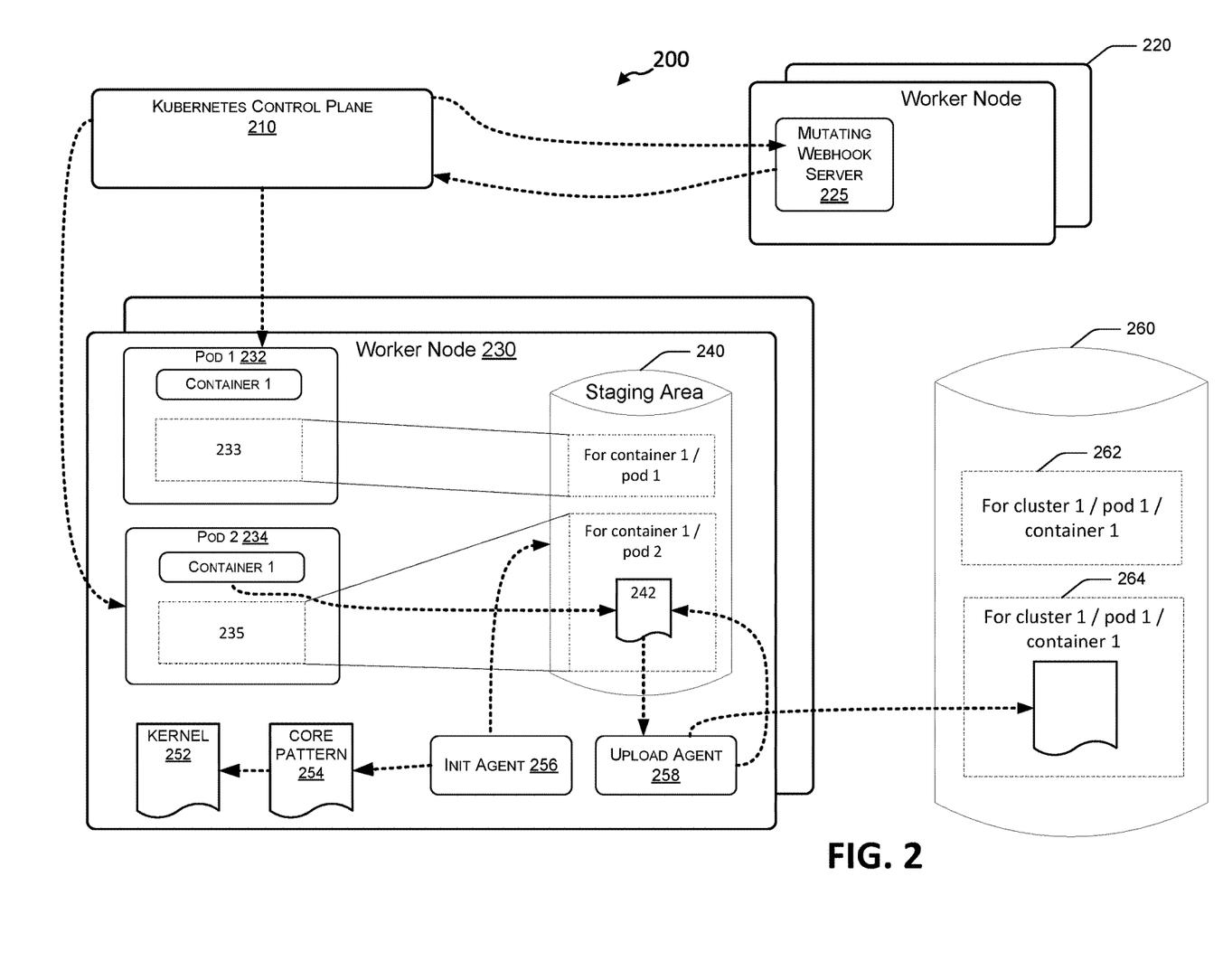
FIG. 2 is a diagram illustrating further details of a diagnostic data collection service in accordance with the present disclosure.

Referring to FIG. 2, illustrated is an example environment 200 implementing a distributed diagnostic data capture function that is capable of capturing and persisting diagnostics data from one or more Kubernetes pods (e.g., replicas) serving a target application or Kubernetes service. Kubernetes control plane 210 may be configured to manage the worker nodes and the pods in the clusters, such as where to place the pods and when to create and or tear down the pods. Worker nodes 220 and 230 are being controlled by the control plane and are the machines that host the pods that are the components of an application workload.

In this example, worker node 230 is configured with a staging area 240 which is a storage area that is allocated to various containers such as container 1 of pod 1 (232) and container 1 of pod 2 (234). Diagnostic data from the containers can be persistently stored in storage 260. Storage 260 can be any suitable storage device(s) that can provide persistent storage for nodes and containers in environment 200 as well as other clusters.

Core pattern 254 may be a configuration file that allows the kernel 252 to write the crash diagnostics.

In an embodiment, when the control plane 210 begins the process of instantiating a pod, the control plane 210 first sends the new pod to the webhook server 225, which returns the pod configured to write diagnostics data to the staging area.

Each pod may be allocated space in the staging area. In some embodiments, the allocated space may be mounted to make the allocated space in the staging area available to the pod.

An upload agent 258 may be configured to monitor the staging area 240. The upload agent 258 may determine that a file is being written. The upload agent 258 may continue to monitor the file and determine whether the container writing the file is finished writing to the file. Once upload agent 258 has determined the container writing the file is finished writing to the file, upload agent 258 may move the file to the area in storage 260 that has been allocated to the container that wrote the file. Once the file has been written, the upload agent 258 may delete the file from the staging area.

In some embodiments, a notification may be provided to the upload agent 258 when a file is being written. In response to the notification, the upload agent 258 may begin the process of determining whether the container writing the file is finished writing to the file. In some embodiments, the upload agent 258 may determine that the container writing the file is finished writing to the file when the file has not been modified for a predetermined time.

In another embodiment, the pods may be configured to write directly to the persistent storage 260. Such configurations may provide different performance predictability as compared to using the upload agent 258. In another embodiment, the staging area 240 can be implemented separately from the nodes. Such a configuration may provide different performance results.

In another embodiment, the application that is writing a diagnostics file can provide a notification as to when it has completed writing the file after the file has been opened. In one embodiment, the application can request that a file remain open and not be moved to the persistent storage and deleted. The upload agent 258 may be configured to wait for a completion notification before writing the file to the persistent storage 260.

In some embodiments, an input tool may be provided that enables a user to request diagnostics data or a subset of the diagnostics data. For example, the user may request one or more of a core file, stack traces, Java heap dumps, or packet captures.

Figure 3:
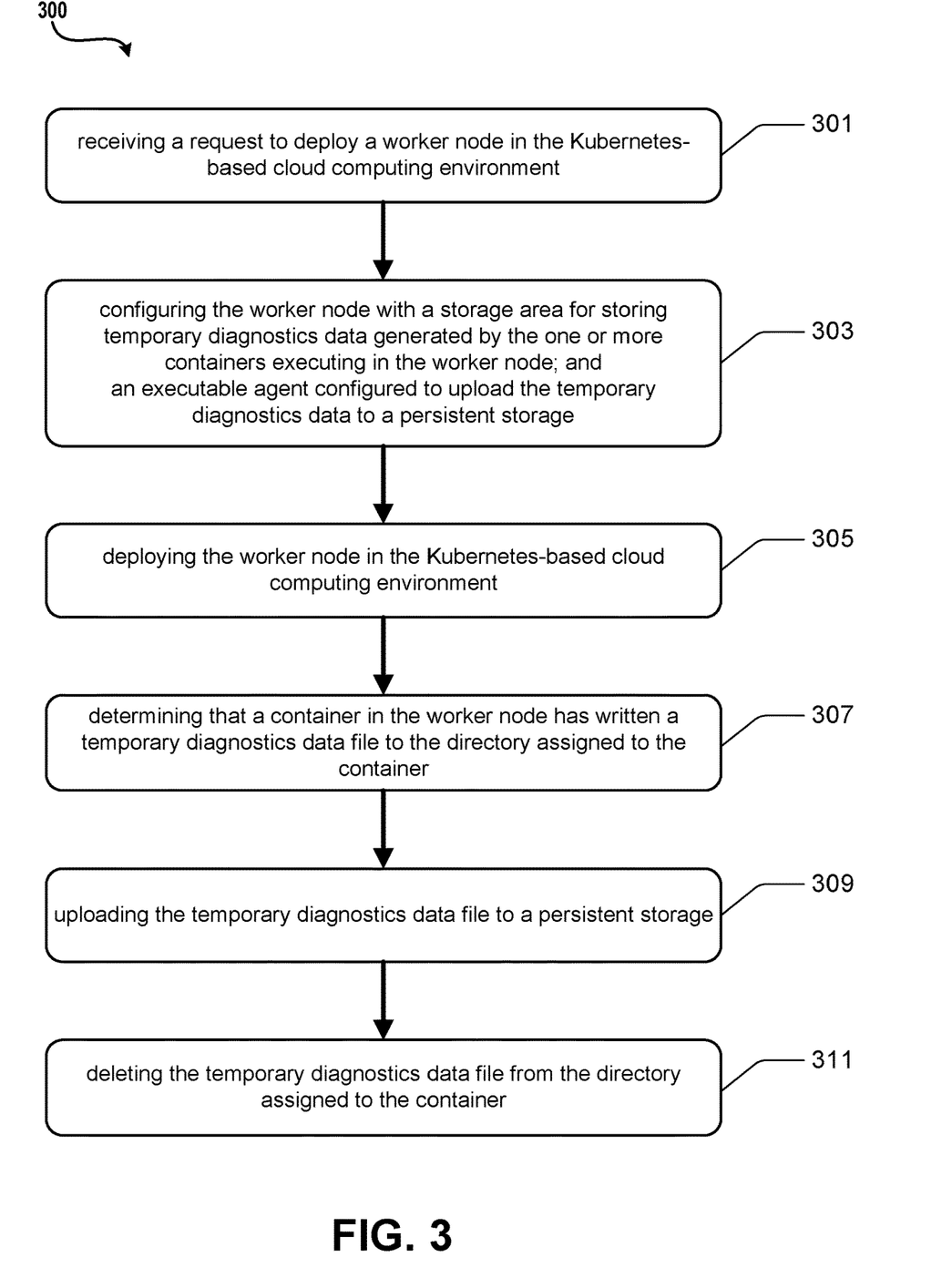
FIG. 3 is a flowchart depicting an example procedure for diagnostic data collection in accordance with the present disclosure.

Turning now to FIG. 3, illustrated is an example operational procedure for capturing and persisting diagnostic data in a Kubernetes-based cloud computing environment.

In an embodiment, the cloud computing environment comprises a plurality of computing devices executing a plurality of worker nodes comprising one or more containers. In an embodiment, the diagnostic data is associated with a target application or service provided by the worker nodes. Such an operational procedure may provide for capturing and persisting diagnostic data and can be provided by one or more components illustrated in FIG. 2. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 3, operation 301 illustrates receiving, by a control plane of the Kubernetes-based cloud computing environment, a request to deploy a worker node in the Kubernetes-based cloud computing environment.

Operation 301 may be followed by operation 303. Operation 303 illustrates in response to the request, configuring, by the control plane, the worker node with a storage area for storing temporary diagnostics data generated by the one or more containers executing in the worker node; and an executable agent configured to upload the temporary diagnostics data to a persistent storage. In an embodiment, each of the one or more containers executing in the worker node is assigned a directory in the storage area for writing a portion of the temporary diagnostics data.

Operation 303 may be followed by operation 305. Operation 305 illustrates deploying, by the control plane, the worker node in the Kubernetes-based cloud computing environment.

Operation 305 may be followed by operation 307. Operation 307 illustrates determining, during the deployment by the executable agent, that a container running in the worker node has written a temporary diagnostics data file to the directory assigned to the container.

Operation 307 may be followed by operation 309. Operation 309 illustrates in response to determining that the container in the worker node has written the temporary diagnostics data file to the directory assigned to the container, uploading, by the executable agent, the temporary diagnostics data file to the persistent storage.

Operation 309 may be followed by operation 311. Operation 311 illustrates subsequent to the uploading of the temporary diagnostics data file to the persistent storage, deleting, by the executable agent, the temporary diagnostics data file from the directory assigned to the container to prevent the container from overwriting the temporary diagnostics data file written to the directory with a new temporary diagnostics data file.

Figure 4:
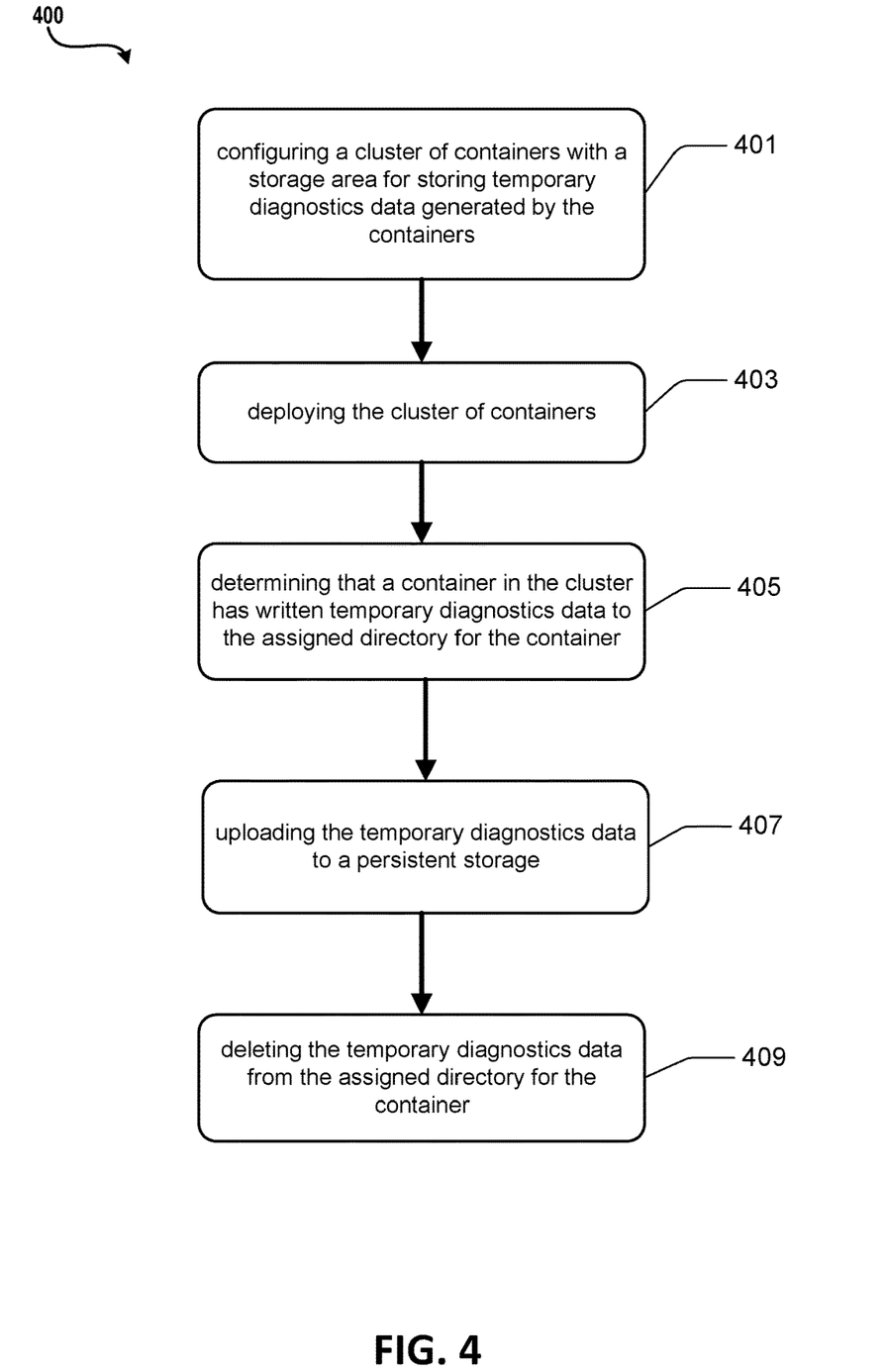
FIG. 4 is a flowchart depicting an example procedure for diagnostic data collection in accordance with the present disclosure.

Referring to FIG. 4, illustrated is another example operational procedure for capturing and persisting diagnostic data in a Kubernetes-based cloud computing environment. Such an operational procedure may provide for capturing network traffic and can be provided by services shown in FIG. 2. The operational procedure may be implemented in a system comprising one or more computing devices. Referring to FIG. 4, operation 401 illustrates in response to a request to deploy a cluster of containers in a virtualized computing environment, configuring a cluster of containers with a storage area for storing temporary diagnostics data generated by the containers, wherein each container in the cluster is assigned a directory in the storage area for writing the temporary diagnostics data associated with each container.

Operation 401 may be followed by operation 403. Operation 403 illustrates deploying the cluster of containers.

Operation 403 may be followed by operation 405. Operation 405 illustrates determining that a container in the cluster has written temporary diagnostics data to the assigned directory for the container.

Operation 405 may be followed by operation 407. Operation 407 illustrates in response to determining that the container in the cluster has written the temporary diagnostics data to the assigned directory for the container, uploading the temporary diagnostics data to a persistent storage.

Operation 407 may be followed by operation 409. Operation 409 illustrates subsequent to the uploading of the temporary diagnostics data to the persistent storage, deleting the temporary diagnostics data from the assigned directory for the container to prevent the container from overwriting the written temporary diagnostics data with new temporary diagnostics data.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 5:
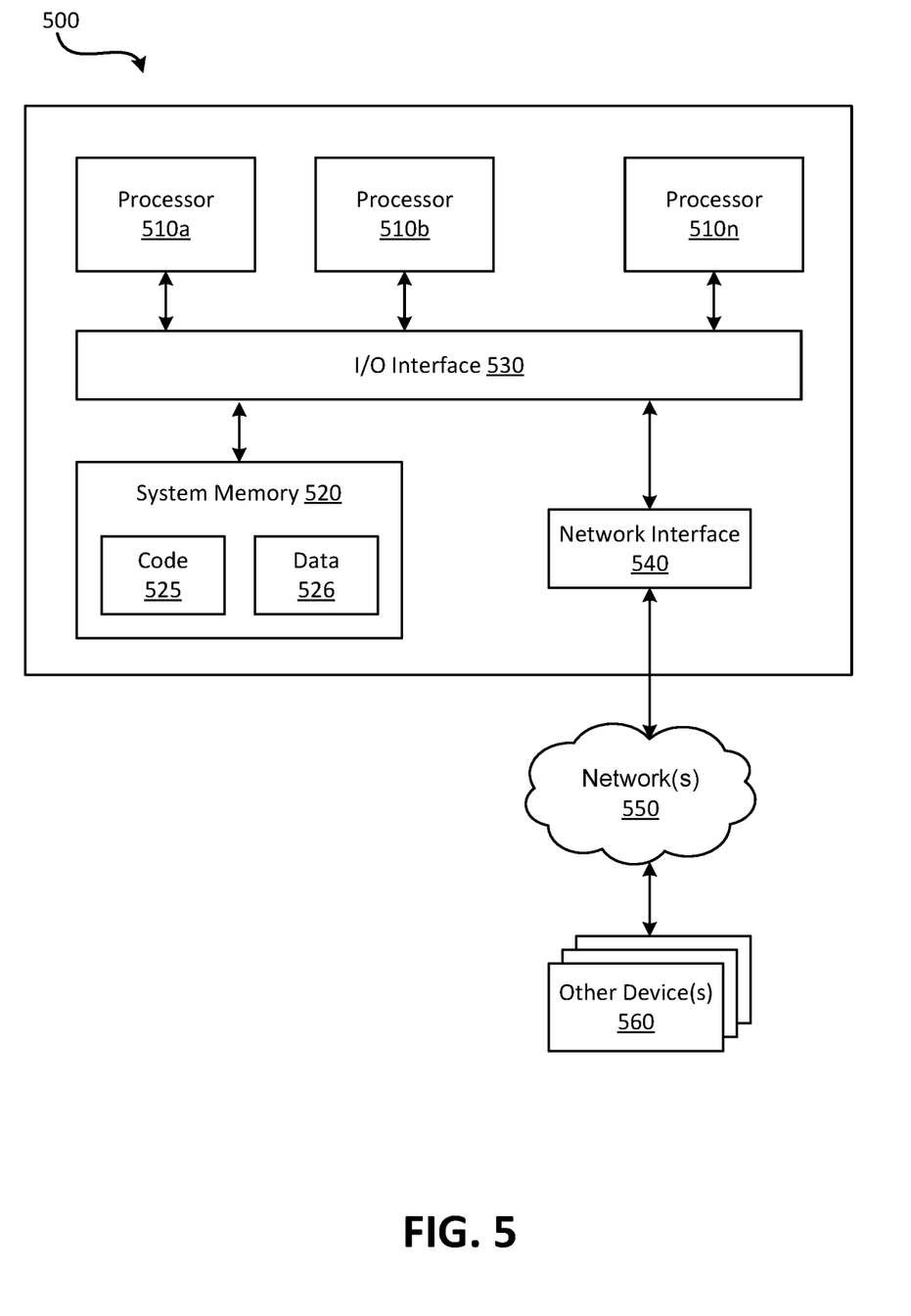
FIG. 5 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x56, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between the processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 4, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for providing a native general-purpose controller for reconciling desired states for resources across a plurality of Kubernetes clusters in a cloud computing environment, the cloud computing environment comprising a plurality of computing devices executing a plurality of Kubernetes clusters comprising one or more containers, the native general-purpose controller implementing a control loop for a state within a cluster, the method comprising:

receiving, by a central controller executing in the cloud computing environment, an indication of a custom resource of the cloud computing environment, the custom resource defining a configuration for an object in one of the Kubernetes clusters in the cloud computing environment, the configuration including a desired state for the object, wherein the Kubernetes cluster containing the object is different from a Kubernetes cluster hosting the central controller;

instantiating an API at the Kubernetes cluster that is to be accessed, the API operable to provide a state of the object and allow the central controller to cause an action by the object;

in response to receiving, by the central controller via the API, an indication that a desired state of the object matches a current state of the object, indicating that the desired state has been reached; and otherwise:

sending, via a corresponding API to a corresponding Kubernetes cluster, a message indicating an action to reconcile the desired state with the current state; and receiving, via the corresponding API, a message indicating that the action to reconcile the desired state with the current state has been completed.

Clause 2: The method of clause 1, further comprising using the temporary diagnostics data file stored in the persistent storage to analyze performance of the container that generated the temporary diagnostics data file.

Clause 3: The method of any of clauses 1-2, wherein each of the containers are:

assigned a unique directory in the persistent storage based on a name, pod, namespace, and cluster ID for the container; and assigned a unique directory in the storage area based on a name, pod, and namespace for the container.

Clause 4: The method of any of clauses 1-3, wherein each container's directory in the storage area is mounted into the container as a well-known directory name.

Clause 5: The method of any of clauses 1-4, wherein the configuring of the worker node comprises automatically mounting each container's directory in the storage area using a mutating admission webhook.

Clause 6: The method of any of clauses 1-5, further comprising receiving, by the agent, a notification that a new temporary diagnostics data file has been created.

Clause 7: The method of clauses 1-6, further comprising determining, by the agent, that the container in the worker node has completed writing the temporary diagnostics data file based on determining that the temporary diagnostics data file has not been updated for a predetermined time period.

Clause 8: The method of any of clauses 1-7, wherein the agent moves the temporary diagnostics data file to a separate directory when the temporary diagnostics data file has been opened.

Clause 9: A system, comprising:
one or more data processing units;
a persistent storage; and a computer-readable medium having encoded thereon computer-executable instructions to cause the one or more data processing units to perform operations comprising:

in response to a request to deploy a cluster of containers in a virtualized computing environment, configuring the cluster of containers with a storage area for storing temporary diagnostics data generated by the containers, wherein each container in the cluster is assigned a directory in the storage area for writing the temporary diagnostics data associated with each container;

deploying the cluster of containers;

determining that a container in the cluster has written temporary diagnostics data to the assigned directory for the container;

in response to determining that the container in the cluster has written the temporary diagnostics data to the assigned directory for the container, uploading the temporary diagnostics data to a persistent storage; and subsequent to the uploading of the temporary diagnostics data to the persistent storage, deleting the temporary diagnostics data from the assigned directory for the container to prevent the container from overwriting the written temporary diagnostics data with new temporary diagnostics data.

Clause 10: The system of clause 9, wherein the temporary diagnostics data includes core data that is written by an OS kernel.

Clause 11: The system of any of clauses 9 and 10, wherein each of the containers are assigned a unique directory in the persistent storage based on a name, pod, namespace, and cluster ID.

Clause 12: The system of any clauses 9-11, wherein:

each of the containers are assigned a unique directory in the storage area based on a name, pod, and namespace; and each container's directory in the storage area is mounted into the container as a well-known directory name.

Clause 13: The system of any clauses 9-12, wherein the configuring of cluster comprises automatically mounting each container's directory in the storage area using a mutating admission webhook.

Clause 14: The system of any clauses 9-13, further comprising computer-executable instructions to cause the one or more data processing units to perform operations comprising:

receiving a notification that a new temporary diagnostics data file has been created; and determining that the container in the cluster has completed writing the temporary diagnostics data file based on determining that the temporary diagnostics data file has not been updated for a predetermined time period.

Clause 15: The system of any clauses 9-14, further comprising computer-executable instructions to cause the one or more data processing units to perform operations comprising:

receiving a first notification that a new temporary diagnostics data file has been created; and determining that the container in cluster has completed writing the temporary diagnostics data file based on a second notification.

Clause 16: A computer-readable storage medium having computer-executable instructions stored thereupon which, when executed by one or more processors of a computing device, cause the computing device to perform operations comprising:

in response to a request to deploy a virtualized function implemented by a plurality of virtual machines in a virtual computing environment, configure the virtual machines with:

storage areas for storing temporary diagnostics data generated by the virtual machines; and an executable agent configured to upload the temporary diagnostics data to a persistent storage;

cause deployment of the virtual machines;

determine that one of the virtual machines has written a temporary diagnostics data file to the assigned directory for the virtual machine;

in response to determining that the virtual machine has written the temporary diagnostics data file to the assigned directory for the virtual machine, upload the temporary diagnostics data file to the persistent storage; and subsequent to the uploading of the temporary diagnostics data file to the persistent storage, delete the assigned directory for the virtual machine to prevent the virtual machine from overwriting the written temporary diagnostics data file.

Clause 17: The computer-readable storage medium of clause 16, wherein the operations are performed in response to a setting for the deployment.

Clause 18: The computer-readable storage medium of any of clauses 16 and 17, further comprising computer-executable instructions stored thereupon which, when executed by one or more processors of a computing device, cause the computing device to determine that the virtual machine has completed writing the temporary diagnostics data file based on determining that the temporary diagnostics data file has not been updated for a predetermined time period.

Clause 19: The computer-readable storage medium of any of the clauses 16-18, wherein:

each of the virtual machines are assigned a unique directory in the storage area based on the virtual machine name, pod, and namespace; and each assigned directory in the storage area is mounted into the virtual machine as a well-known directory name.

Clause 20: The computer-readable storage medium of any of the clauses 16-19, wherein the configuring of the virtual machine comprises automatically mounting each assigned directory in the storage area using a mutating admission webhook.

What is claimed is:

1. A method of capturing and persisting diagnostic data in a Kubernetes-based cloud computing environment comprising a plurality of computing devices executing a plurality of worker nodes, where each worker node is configured to execute one or more containers, the method comprising:

receiving, by a control plane of the Kubernetes-based cloud computing environment, a request to deploy a worker node in the Kubernetes-based cloud computing environment;

in response to the request, configuring, by the control plane, the worker node with:

a storage area for storing temporary diagnostics data files generated by the one or more containers executing in the worker node; and an executable agent configured to upload the temporary diagnostics data files to a persistent storage;

wherein each of the one or more containers executing in the worker node is assigned a directory in the storage area for writing a portion of the temporary diagnostics data;

deploying, by the control plane, the worker node in the Kubernetes-based cloud computing environment;

determining, during the deployment by the executable agent, that a container running in the worker node has written a temporary diagnostics data file to the directory assigned to the container;

in response to determining that the container in the worker node has written the temporary diagnostics data file to the directory assigned to the container, uploading, by the executable agent, the temporary diagnostics data file to the persistent storage; and subsequent to the uploading of the temporary diagnostics data file to the persistent storage, deleting, by the executable agent, the temporary diagnostics data file from the directory assigned to the container to prevent the container from overwriting the temporary diagnostics data file written to the directory with a new temporary diagnostics data file.

2. The method of claim 1, further comprising using the temporary diagnostics data file stored in the persistent storage to analyze performance of the container that generated the temporary diagnostics data file.

3. The method of claim 1, wherein each of the containers are:
assigned a unique directory in the persistent storage based on a name, pod, namespace, and cluster ID for the container; and
assigned a unique directory in the storage area based on a name, pod, and namespace for the container.

4. The method of claim 3, wherein each container's directory in the storage area is mounted into the container as a well-known directory name.

5. The method of claim 4, wherein the configuring of the worker node comprises automatically mounting each container's directory in the storage area using a mutating admission webhook.

6. The method of claim 1, further comprising receiving, by the agent, a notification that a new temporary diagnostics data file has been created.

7. The method of claim 1, further comprising determining, by the agent, that the container in the worker node has completed writing the temporary diagnostics data file based on determining that the temporary diagnostics data file has not been updated for a predetermined time period.

8. The method of claim 1, wherein the agent moves the temporary diagnostics data file to a separate directory when the temporary diagnostics data file has been opened.

9. A system, comprising:
one or more processors;
a persistent storage; and
a computer-readable medium having encoded thereon computer-executable instructions that, when executed by the one or more data processors, cause the system to perform operations comprising:
in response to a request to deploy a cluster of containers in a virtualized computing environment, configuring the cluster of containers with a storage area for storing temporary diagnostics data generated by the containers, wherein each container in the cluster is assigned a directory in the storage area for writing the temporary diagnostics data associated with each container;
deploying the cluster of containers;
determining, by an agent executing in the system, that a container in the cluster has written temporary diagnostics data to the assigned directory for the container;
in response to determining that the container in the cluster has written the temporary diagnostics data to the assigned directory for the container, uploading the temporary diagnostics data to the persistent storage; and
subsequent to the uploading of the temporary diagnostics data to the persistent storage, deleting, by the agent, the temporary diagnostics data from the assigned directory for the container to prevent the container from overwriting the written temporary diagnostics data with new temporary diagnostics data.

10. The system of claim 9, wherein the temporary diagnostics data includes core data that is written by an OS kernel.

11. The system of claim 9, wherein each of the containers are assigned a unique directory in the persistent storage based on a name, pod, namespace, and cluster ID.

12. The system of claim 9, wherein:
each of the containers are assigned a unique directory in the storage area based on a name, pod, and namespace; and
each container's directory in the storage area is mounted into the container as a well-known directory name.

13. The system of claim 12, wherein the configuring of the cluster comprises automatically mounting each container's directory in the storage area using a mutating admission webhook.

14. The system of claim 13, further comprising computer-executable instructions to cause the one or more data processing units to perform operations comprising:
receiving a notification that a new temporary diagnostics data file has been created; and
determining that the container in the cluster has completed writing the temporary diagnostics data file based on determining that the temporary diagnostics data file has not been updated for a predetermined time period.

15. The system of claim 9, further comprising computer-executable instructions to cause the one or more data processing units to perform operations comprising:
receiving a first notification that a new temporary diagnostics data file has been created; and
determining that the container in the cluster has completed writing the temporary diagnostics data file based on a second notification.

16. A computer-readable storage medium having computer-executable instructions stored thereupon which, when executed by one or more processors of a computing device, cause the computing device to perform operations comprising:
in response to a request to deploy a virtualized function implemented by a plurality of virtual machines in a virtual computing environment, configure the virtual machines with:
storage areas for storing temporary diagnostics data files generated by the virtual machines; and
an executable agent configured to upload the temporary diagnostics data files to a persistent storage;
cause deployment of the virtual machines;
determine that one of the virtual machines has written a temporary diagnostics data file to an assigned directory for the one virtual machine;
in response to determining that the one virtual machine has written the temporary diagnostics data file to the assigned directory for the one virtual machine, upload the temporary diagnostics data file to the persistent storage; and
subsequent to the uploading of the temporary diagnostics data file to the persistent storage, delete the assigned directory for the one virtual machine to prevent the one virtual machine from overwriting the written temporary diagnostics data file.

17. The computer-readable storage medium of claim 16, wherein the operations are performed in response to a setting for the deployment.

18. The computer-readable storage medium of claim 16, further comprising computer-executable instructions stored thereupon which, when executed by one or more processors of a computing device, cause the computing device to determine that the one virtual machine has completed writing the temporary diagnostics data file based on determining that the temporary diagnostics data file has not been updated for a predetermined time period.

19. The computer-readable storage medium of claim 16, wherein:
- each of the virtual machines are assigned a unique directory in the storage area based on a name, pod, and namespace for the one virtual machine; and
- each assigned directory in the storage area is mounted into the one virtual machine as a well-known directory name.

20. The computer-readable storage medium of claim 19, wherein the configuring of the virtual machine comprises automatically mounting each assigned directory in the storage area using a mutating admission webhook.

* * * * *